(12) United States Patent
Stewart et al.

(10) Patent No.: US 7,191,104 B2
(45) Date of Patent: Mar. 13, 2007

(54) METHOD OF REAL-TIME COLLISION DETECTION BETWEEN SOLID GEOMETRIC MODELS

(75) Inventors: Paul Joseph Stewart, Ann Arbor, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 789 days.

(21) Appl. No.: 10/193,566

(22) Filed: Jul. 11, 2002

(65) Prior Publication Data

US 2004/0010346 A1 Jan. 15, 2004

(51) Int. Cl.
*G06F 7/60* (2006.01)
(52) U.S. Cl. ......................................... 703/2
(58) Field of Classification Search .................... 703/2, 703/16
See application file for complete search history.

(56) References Cited

U.S. PATENT DOCUMENTS

| | | | |
|---|---|---|---|
| 4,474,035 A | 10/1984 | Amin et al. | |
| 5,150,452 A | 9/1992 | Pollack et al. | |
| 5,177,982 A | 1/1993 | Plemens | |
| 5,347,459 A | 9/1994 | Greenspan et al. | |
| 5,515,489 A | 5/1996 | Yaeger | |
| 5,548,694 A | 8/1996 | Frisken Gibson | |
| 5,572,634 A | 11/1996 | Duluk, Jr. | |
| 5,625,575 A * | 4/1997 | Goyal et al. ..................... | 703/6 |
| 5,694,013 A | 12/1997 | Stewart et al. | |
| 5,761,391 A | 6/1998 | Sato et al. | |
| 5,973,678 A | 10/1999 | Stewart et al. | |
| 6,049,756 A | 4/2000 | Libby | |
| 6,191,796 B1 * | 2/2001 | Tarr .............................. | 345/581 |
| 6,629,065 B1 * | 9/2003 | Gadh et al. ..................... | 703/1 |
| 6,714,901 B1 * | 3/2004 | Cotin et al. ..................... | 703/7 |
| 6,792,398 B1 * | 9/2004 | Handley et al. ................ | 703/2 |
| 2004/0236541 A1 * | 11/2004 | Kramer et al. ................. | 703/1 |

OTHER PUBLICATIONS

Simulating Arthroscopic Knee Surgery using Volumetric Object Representations, Real-time Volume Rendering and Haptic Feedback, (by Gibson et al. 1997 Google Scholar).*
Baraff, D., "Fast contact force computation for nonpenetrating rigid bodies," Computer Graphics, Proceedings, SIGGRAPH, 28:23-34, 1994.

(Continued)

*Primary Examiner*—Paul Rodriguez
*Assistant Examiner*—Andre Pierre-Louis
(74) *Attorney, Agent, or Firm*—Gary A. Smith

(57) ABSTRACT

A system and method of real-time collision detection between solid geometric objects is provided. The system includes a computer system, a computer-generated geometric model and a haptic device in communication with the computer system having a haptic end effector for transmitting information between a user and the geometric objects. The method includes the steps of representing a moving object as a point cloud and a stationary object as a mesh, and partitioning the mesh into an organized data structure. The method also includes the steps of identifying a constraint set and a collision set. The method further includes the steps of rendering the constraint set by moving the moving object so that the set of active points do not penetrate into the mesh, and providing force feedback through the haptic device relative to the movement of the moving object to satisfy the constraint.

20 Claims, 10 Drawing Sheets

OTHER PUBLICATIONS

Harada, Mikako, et al., "Interactive Physically-Based Manipulation of Discrete/Continuous Models", Computer Graphics Proceedings, Annual Conference Series, 1995, pp. 1-11.

Cohen, J.D. et al., "I-COLLIDE: An Interactive and Exact Collision Detection System for Large-Scale Environments." In Proceedings, 1995 Symposium on Interactive 3D Graphics (pp. 189-196) New York: ACM (1995).

Lin, M.C. et al., "A Fast Algorithm for Incremental Distance Calculation," Proceedings of IEEE Robotics and Automation Conference, pp. 1008-1014, Apr. 1991.

Avila, R.S. et al., "A Haptic Interacctive Method for Volume Visualization," Proc. of Visualization '96 pp. 197-204. San Francisco, Oct. 1996.

Zilles, C.B. et al., "A Constraint-based God-object Method for Haptic Display," Proceedings IEEE/RSJ Int. Conf. on Intelligent Robots and Systems, Pittsburgh, PA, 1995, pp. 146-151.

McNeely, W.A. et al., "Six-Degrees-of-Freedom Haptic Rendering Using Voxel Sampling," Proceedings SIGGRAPH 1999.

Quinlan, S., "Efficient Distance Computation between Non-Convex Objects," Proceedings of IEEE Robotics and Automation, 1994.

Gilbert, E.G. et al., "A Fast Procedure for Computing the Distance Between Complex Objects in Three-Dimensional Space," IEEE Journal of Robotics and Automation 4(2), Apr. 1998.

Nelson, D. et al., "Haptic Rendering of Surface-to-Surface Sculpted Model Interaction," ASME, IMECE, Dynamic System and Controls, Nov. 1999.

Gregory, A. et al., "Six Degree-of-Freedom Haptic Display of Polygonal Models," ASME, IMECE, Dynamics Systems and Controls, Nov. 1999.

* cited by examiner

METHOD OF REAL-TIME COLLISION DETECTION BETWEEN SOLID GEOMETRIC MODELS

BACKGROUND OF THE INVENTION

1. Field of the Invention

The present invention relates generally to computer-aided design of vehicles and, more specifically, to a method of real-time collision detection between solid geometric models in the design of a vehicle.

2. Description of the Related Art

Vehicle design, and in particular the design of an automotive vehicle, has advanced to a state in which computer aided design techniques are frequently incorporated in the development of a new vehicle, or redesign of an existing vehicle. At the same time, enhanced visualization software tools have been developed that allow for interactive display and evaluation of large models, including models developed using computer-aided design. In the field of vehicle design, the use of both computer-aided design and visualization techniques is especially beneficial in designing, packaging and assembling the various systems incorporated within the vehicle, to maximize the design and functional capabilities of these vehicles. Advantageously, potential vehicle system designs can be considered in a timely and cost-effective manner by analyzing a digital representation of a proposed design, versus preparing an actual vehicle model.

Various aspects of the design task for a vehicle include detecting interferences between components, evaluating assembly processes, and understanding vehicle ergonomics. Recently, these types of design tasks have been accomplished using tools such as virtual reality simulations.

A user-held interface device, such as a haptic interface, serves as a tactical interface between the user and the virtual world. The haptic interface allows the computing of reaction forces as a result of touching or pushing a virtual object and is a physical device that delivers the computed force to the user through end effectors. An example of such a haptic interface is disclosed in commonly assigned U.S. Pat. No. 5,694,013 to Stewart, et al., entitled "Force Feedback Haptic Interface for a Three-Dimensional CAD Surface," the disclosure of which is incorporated by reference. Advantageously, the haptic device reproduces at a high rate of speed the sensation of freely moving an object within a constrained environment by determining the forces exchanged between the interacting geometries.

Collision detection is one technique used in conjunction with visualization tools to detect if and by how much two objects interpenetrate. More recently, there is a need for software tools that not only detect penetration, but also calculate the dynamic motion generated by the collisions between objects to compute reaction force by determining whether, and by how much, two objects interpenetrate. This process is referred to as collision rendering. Advantageously, collision rendering is applied in the simulation of dynamic models, that may be moving in response to internal and external forces. Collision rendering is also applicable to the design process to determine how an object moves within a constrained environment, such as the installation of an engine within the engine compartment of a vehicle. A disadvantage of collision rendering for a model as complex as a vehicle is that it is a mathematically complex problem and finding a solution in a predetermined time frame requires some approximations.

Various collision detection methods have been utilized in the past. One method involves a volumetric representation that divides a space into small eight-sided units, called voxels. Each voxel is assigned a value of zero if part of free space, or one if part of the object. The set of all voxels is called a voxmap. A collision is determined by computing the discrete position of a point in space in the voxmap and checking if the corresponding element is zero, representing no collision, or one, signaling a collision. While this method works well for simple systems, it is less accurate for more complex models, since the size of the individual voxel determines the accuracy of the geometric representation, and significant amounts of computer memory are required for complex models. Also, it is difficult to accurately prepare a voxmap from a model as complex as a CAD model of a vehicle, or convert a modified voxmap back into a CAD model.

Another method of collision detection includes creating a mesh model of the CAD model, which is a collection of polygons describing the surface of the CAD model. While this method works well, the search for a polygon colliding with the haptic device is more time consuming than the voxel method. Also, unless the CAD model is already in a mesh format, the geometry represented by a NURBS format, or other free form representation, has to be translated into a mesh. A disadvantage is a decrease in model fidelity and topology.

Still another method of collision detection includes a tracking algorithm to detect collisions with a free form surface. The tracking algorithm determines a tracking point on the surface of the CAD model using a numerical approximation starting from the closest point calculated during a previous iteration. Thus, once an initial point is found, the motion of a cursor can be tracked over the surface. Only the parametric domain and trim boundaries limit the tracking motion. While tracking algorithms work well for collision detection, it can be difficult and time consuming to find an initial starting point. Also, certain geometric features of a NURBS surface, such as ridges and cusps formed by points and knots need to be considered separately from the other NURBS surfaces of the CAD model. Traditionally, the closest point to a polygonal mesh is found by representing the mesh as an unconnected group of triangles. A map, such as a Voronoi map is used to assign the elements of the polygonal soup to different regions of the map, so that coherence can be exploited to check the distance to only those polygons belonging to regions that neighbor the current location of the potentially colliding point. However, this technique does not take advantage of connectivity between triangles by assuming the mesh represents a manifold and each triangle will have neighboring triangles, and each vertex a set of connected polygons.

Another example of a collision detection method is disclosed in co-pending patent application U.S. Ser. No. 09/686,601, the disclosure of which is hereby incorporated by reference. This method of collision detection is for a point-to-surface collision based on a tessellated mesh. While this method works well, its application is limited to the interaction between a point and a surface.

Thus, there is a need in the art for an efficient method of real-time collision detection between a solid moving object represented as a point cloud and a tessellated mesh of a solid, stationary object, and provides force feedback to a user regarding the collision.

SUMMARY OF THE INVENTION

Accordingly, the present invention is a system and method of real-time collision detection between solid geometric models. The system includes a computer system having a memory, a processor, a user input device and a display device; and at least one computer-generated geometric model stored in the memory of the computer system. The system also includes a haptic device operatively in communication with the computer system, and the haptic device includes a haptic end effector for transmitting information between a user and the geometric model.

A geometric object from the geometric model is represented as a point cloud and another geometric object from the geometric model is represented as a mesh and at least one of the objects is moving. The mesh is partitioned into an organized data structure, a constraint set is identified by selecting actively colliding points from the point cloud, a collision set is identified by tracking points in the point cloud and selecting those that penetrate the mesh. The constraint set is rendered by moving the colliding objects so that none of its points penetrate into the mesh, and force feedback is provided to the user through the haptic device relative to how much the two objects had to be moved to satisfy the constraints.

The method includes the steps of representing one object from geometric model as a point cloud and another object from the geometric model as a mesh, such that at least one of the objects is moving, and partitioning the mesh into an organized data structure. The method also includes the steps of identifying a constraint set by selecting actively colliding points from the point cloud and identifying a collision set, such that the collision set includes points from the point cloud colliding with the partitioned mesh. The method further includes the steps of rendering the constraint set, so that the points in the constraint set do not penetrate into the mesh, and providing force feedback to a user through a haptic device relative to the penetration of the point cloud into the mesh.

One advantage of the present invention is that a system of real-time collision detection between solid geometric models is provided to virtually detect and to render the physical interaction between solid objects. Another advantage of the present invention is that a method is provided that is mathematically efficient in replicating the physical interaction between a moving object and a stationary object within a complex CAD model. Yet another advantage of the present invention is that a method is provided that can be utilized in an interactive visual simulation of the dynamic interaction between objects by replicating a kinematic parameter, such as acceleration. Still another advantage of the present invention is that the method integrates tactile feedback in a force-enabled simulation to replicate a physical interaction between the moving object and the stationary object. A further advantage of the present invention is that a method is provided that determines a dynamic motion generated by the collision between a solid moving object represented by a point cloud and the solid stationary object represented by a tessellated mesh of a CAD model. Yet a further advantage of the present invention is that a method is provided that virtually simulates a dynamic task, such as assembly or disassembly of a system component.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Vehicle design is achieved, according to the present invention, with a generic parametric driven design process. Advantageously, this process allows for flexibility in vehicle design and engineering analysis of the design in a fraction of the time required using conventional design methods. Various computer-based tools are integrated to achieve this enormous time and expense savings, including solid modeling, parametric design, and automated studies.

Figure 1:
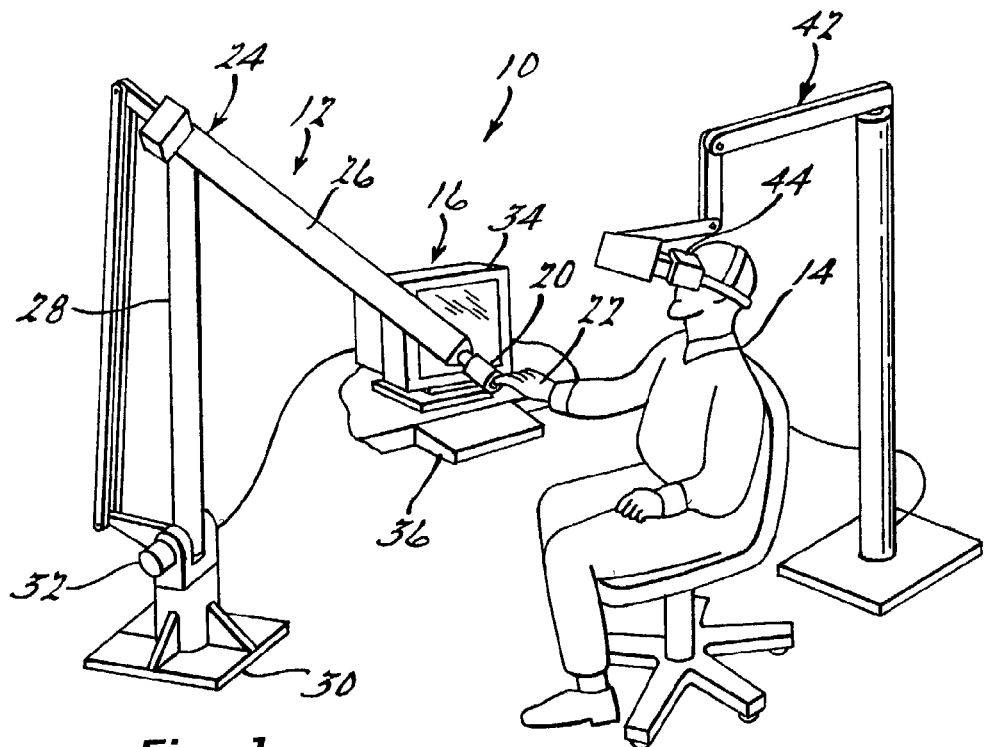
FIG. 1 is a perspective view of a system for implementing a method of real-time collision detection between geometric models.
Figure 2:
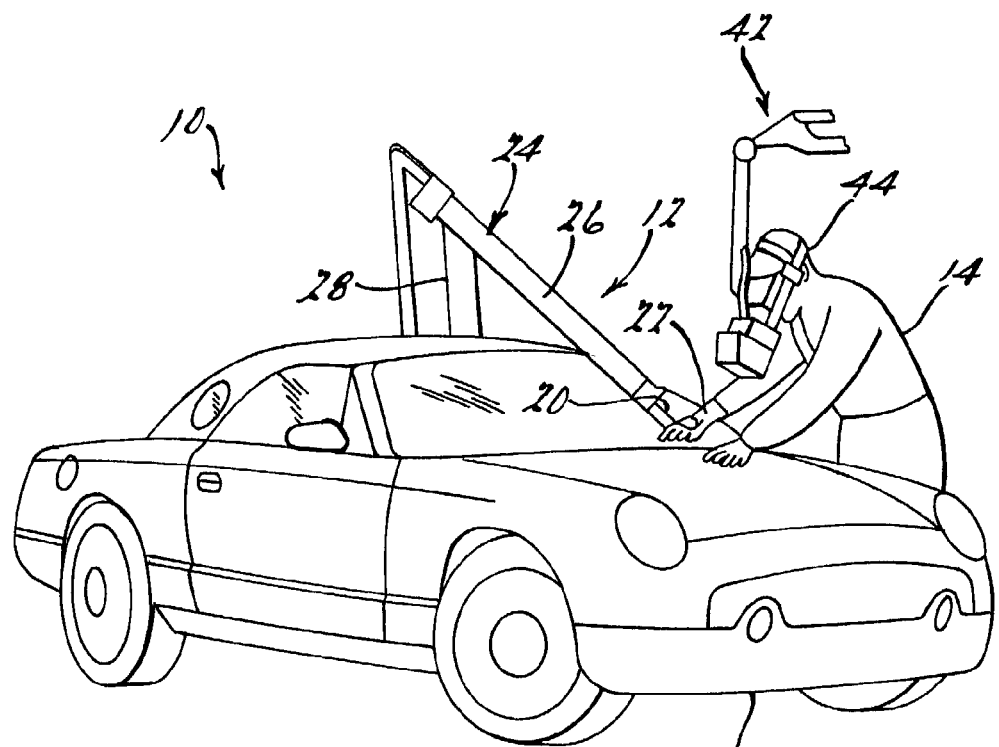
FIG. 2 is a perspective view illustrating the use of the system and method of real-time collision detection between solid geometric models in a virtual environment.

Referring to the drawings and in particular FIGS. 1 and 2, one embodiment of a system 10 used by a method of real-time collision detection between solid geometric models, according to the present invention, are illustrated graphically. Advantageously, the system 10 can be utilized to evaluate a vehicle design based on various factors, such as assembly verification, and ergonomics, early in the design process. The system 10 includes a force feedback interface 12 operated by a user 14 that provides position, orientation, and force feedback between the user 14, a computer system 16, and an object 18. It should be appreciated that the model refers to a three-dimensional geometric model, or a physical model as illustrated in FIG. 2. The model is typically generated through the use of conventional computer aided design (CAD), including computer aided manufacturing (CAM), and computer-aided engineering (CAE) techniques. Preferably, the model is electronically stored in a database on an electronic storage device. The object 18 refers to a portion of the vehicle model, another item or the like that is geometrically described.

An example of a force feedback interface 12 is a haptic device, as is known in the art. The force feedback device 12 includes an end effector 20, such as a stylus, pen, or any other similar gripping device. The end effector 20 is grasped by a user 14 and generates sensations of rigidity and facial roughness of the object 18. In automotive styling, for example, the end effector 20, in conjunction with the collision detection method to be described, enables the user 14 to touch, feel and edit complex three-dimensional CAD geometry. The end effector 20 also transmits contact force information to the user 14, to indicate a collision. For example, the end effector 20 provides a physical connection between a hand 22 of the user 14 and a computer model, allowing the user 14 to touch the computer model. For example, the user 14 can tap on a portion of the computer model. Advantageously, the force feedback interface provides an interface between a real world and a virtual world.

The force feedback device 12 also includes a hingeable arm 24 operatively connected to the end effector 20. In this example, there is an upper arm 26 and a lower arm 28. The lower arm 28 is operatively attached to a base 30. The hingeable arm 24 is operatively connected to an actuating device 32, such as a servo I/O interface, or other similar device capable of transmitting forces to the end effector 20 through the upper and lower arms 26, 28 in at least three degrees of freedom. Information regarding a collision between one object 18 with another is transmitted through the end effector 20 and the upper and lower arms 26, 28 to the computer system 16. The collision may include a single point of contact, or multi-point contact.

The system 10 further includes a computer system 16, as is known in the art, operatively connected to the force feedback device 12. The computer system 16 includes a processor, a controller, and a memory to process information relevant to the method of real-time collision detection between geometric models. Preferably, the electronic storage device containing the geometric representation of the model is in communication with the computer system 16. The computer system 16 includes a display device 34, such as a video terminal, to display the vehicle model. The user 14 inputs information into the computer system 16 when prompted to do so. The user 14, via a user interactive device 36, such as a keyboard, mouse, or the like, can achieve selection and control of the information within a screen. The set of parameters or the set of instructions may be specific to the method of collision detection, wherein other data and information non-specific to the method of collision detection may already be stored in the memory of the computer system 16. One example of an input method is a pop-up dialog box containing available information or instruction. For example, information may be representative of different vehicle design alternatives. The computer system 16 utilizes the set of information or instruction from the user 14 and any other information in carrying out a method, according to the present invention and discussed in detail subsequently, of real-time collision detection between solid geometric models.

Figure 14:
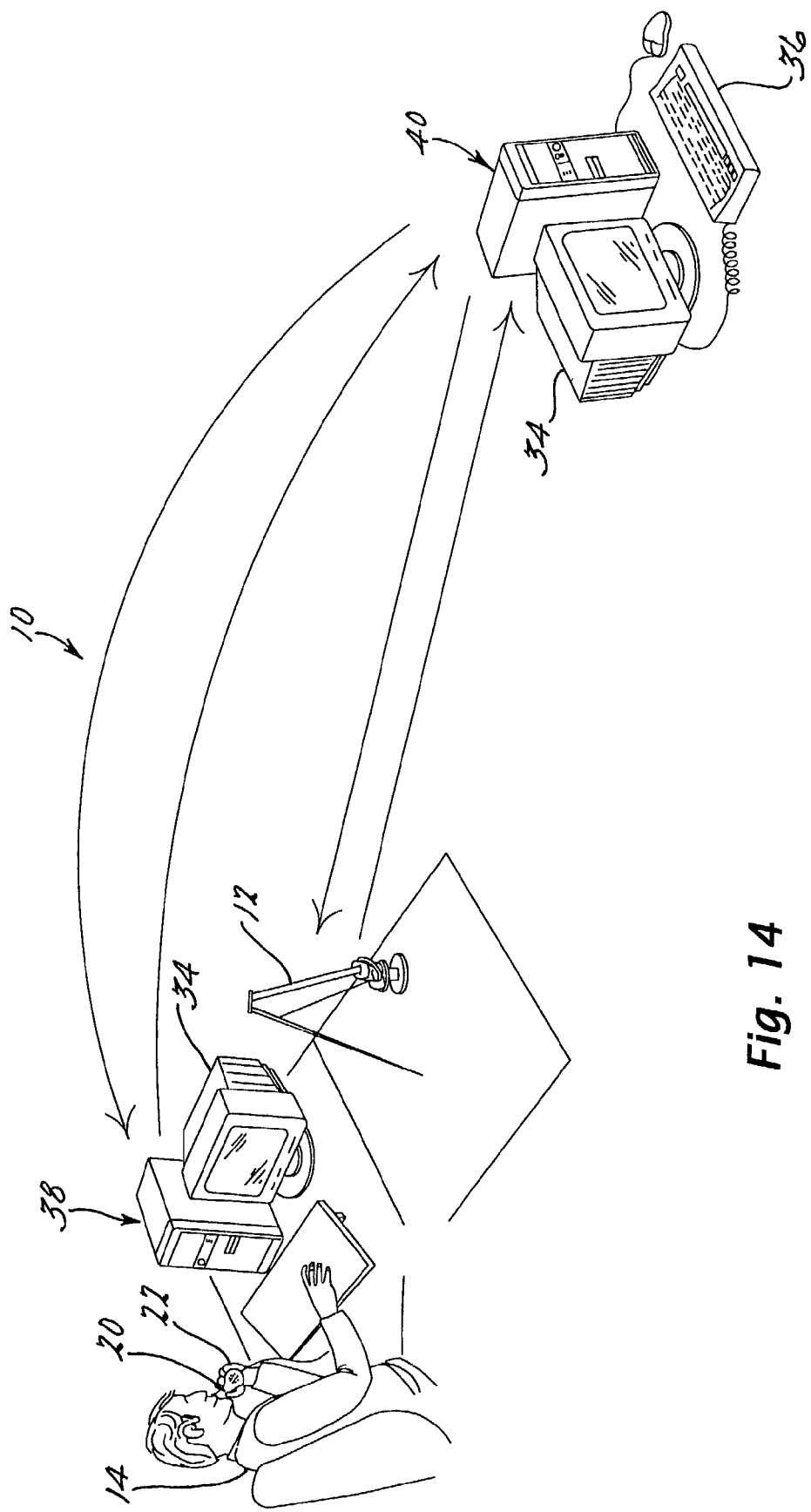
FIG. 14 is a schematic illustration of a system of including two computer systems, according to the present invention.

It should be appreciated that the computer system 16 may include a plurality of interconnected computer systems, as illustrated in FIG. 14. For example, the computer system 16 may include a first computer system 38 that operates at a slower, higher level, to carry out the method of collision detection, by determining a set of constraint points between a moving object and a stationary object. The first computer system 38 is operatively connected to a second computer system 40 that operates at a faster, lower level, to implement the force feedback feature of the method. The second computer system 40 operates at a higher refresh rate to render the constraint set, to ensure that all points do not penetrate into the mesh model. For example, the end effector position is iteratively read in joint space, the position is transformed into Cartesian space, the desired force to be applied by the end effector 20 in Cartesian space based on the geometry of a local feature on the mesh model is calculated. The desired impedance-physical properties of the mesh model are determined, and such forces are mapped onto joint space to calculate the desired torques to command the device actuators.

The system 10 also includes a virtual reality display system 42, such as a head mounted display mechanism 44, as is known in the art. The head mounted display mechanism 44 is worn by the user 14 and allows the user 14 to "see" a virtual environment, which in this example is the CAD model of a vehicle. The virtual reality display system 42 is in communication with the computer system 16, and provides the user 14 a view through a virtual human's eyes, or a first person view of the virtual environment.

In operation, the controller sends the computer system 16 a signal representing a joint position for the joints between the end effector 20, upper arm 26, lower arm 28 and base 30, respectively. The computer system 16 sends force signals to a controller (not shown), which controls the actuating device 32 to produce the necessary forces at the force feedback device 12. The user 14 can view the geometric model on the display screen 34 or in the head mounted display mechanism 44. In this example, the user 14 uses the end effector 20 to manipulate an object with respect to another object.

The method of the present invention enables the user 14 to touch, feel and otherwise evaluate the geometric model. Advantageously, this is a time and cost savings as compared to performing the same operations on a physical prototype. Furthermore, the computer-implemented method of real-time collision detection between solid geometric models combines all of the foregoing to provide an efficient, flexible, rapid tool for evaluating the design of a vehicle. Also, information obtained during the evaluation of the design is an output of the method and is available for further analysis and study.

Figure 3A:
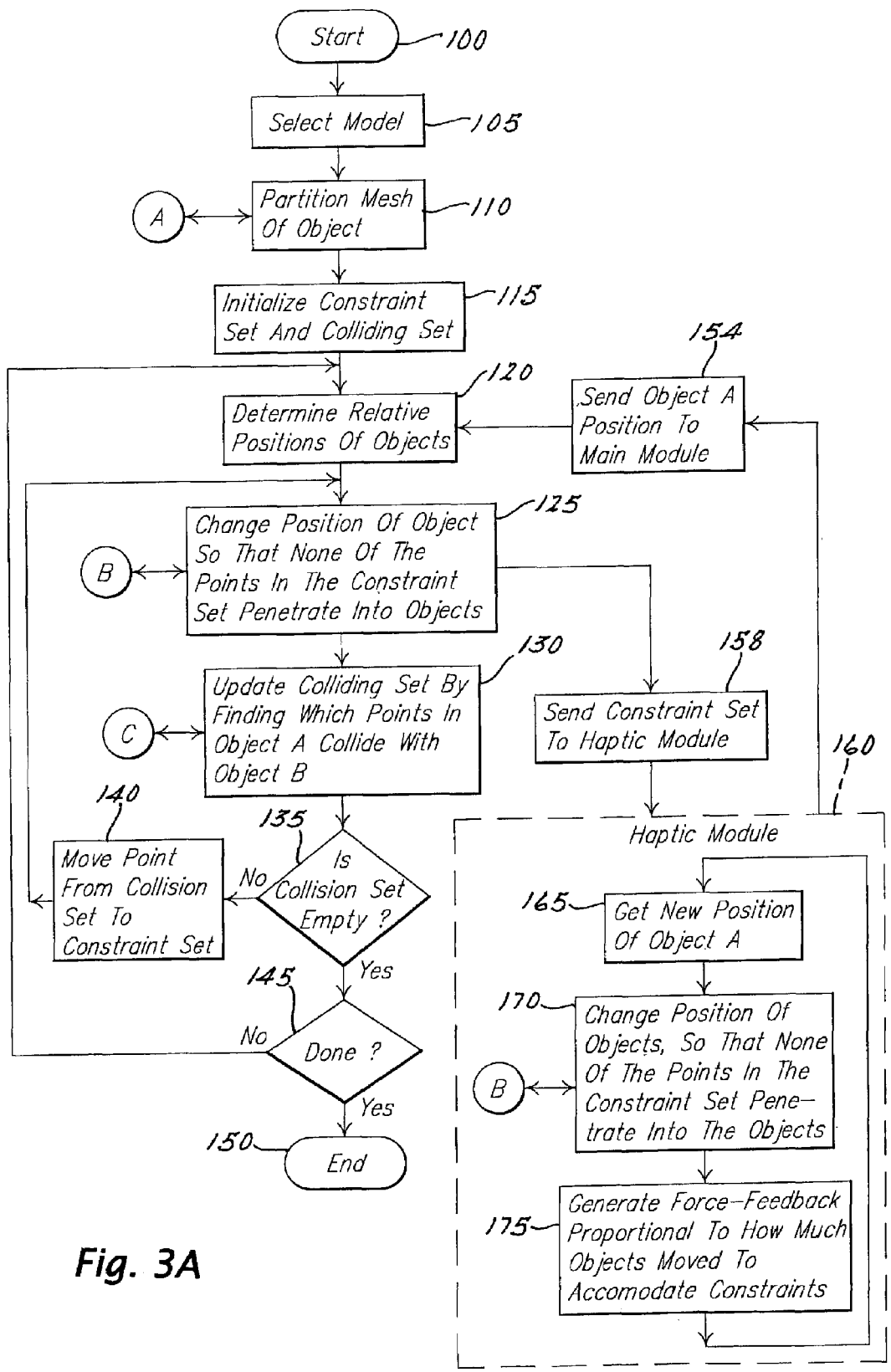
FIGS. 3A–3D are flowcharts illustrating a method of real-time collision detection between geometric models, according to the present invention.

Referring to FIG. 3A, a method, according to the present invention, of real-time collision detection between solid geometric models is illustrated. The methodology is implemented using the system 10 described with respect to FIGS. 1, 2 and 14. The methodology is used to realistically render collisions between solids by modeling one object as a point cloud and another object as tessellated mesh. In this example, one object is moving and is represented by a point cloud, and the other object is stationary and represented by the mesh. It is contemplated that both objects could be moving, with one modeled as a point cloud and the other as a mesh. To detect a collision, tracking techniques in conjunction with space partitioning of the data into an OctTree structure is utilized. Tracking is used to track the position of a point on the mesh over time, as well as find the initial position for adjacent points. To render a collision, a minimum set of local features is found to model all potential interaction between the stationary and moving objects. Given a set of collision points, the local feature is extracted and the non-penetrating constrained position of the moving or colliding object is determined. In this example, the local feature is identified by a non-redundant set of points in the point cloud that are in active contact with the mesh, also called the constraint set. In operation, the rendering process is divided into two parallel loops: a higher level loop implemented by a first computer system 38 for determining the active set of contact points running at a slower refresh rate; and a lower level loop implemented by a second computer system 40 for rendering the constraint set by ensuring that all points do not penetrate into the mesh, that runs at a faster refresh rate. It should be appreciated that the methodology can be implemented in an iterative manner. The method begins in block 100 and continues to block 105.

Figure 4:
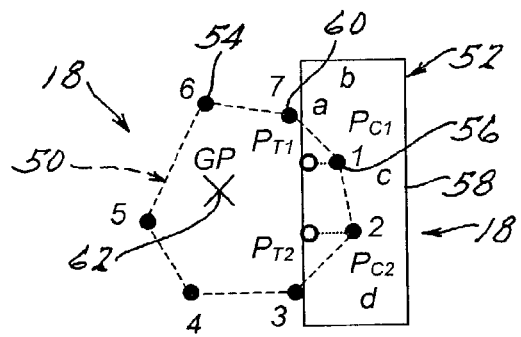
FIG. 4 is a schematic illustration of a point cloud colliding with a mesh, according to the present invention.

In block 105, the user 14 selects a geometric model for interactive evaluation and the model is imported into the methodology. Preferably, the geometric model is a computer generated computer-aided design (CAD) model, digital buck or other mathematical or geometric representation that is maintained in the computer database connected to the computer system 16. The model is represented using a known data format, such as a tessellated mesh, a point cloud, or both. In this example, the model is representative of a vehicle, and in particular a portion of a body of the vehicle. Further, the user 14 selects a surface, referred to as an object 18, representing a section of the model to evaluate, such as by drawing a box around the desired section using the user interactive device 36, such as the mouse. As is known in the art, the drawing process involves a click, drag and release of the mouse. Referring to FIG. 4, the collision of an object 18 represented by a point cloud 50 with another object 18 represented by a tessellated mesh 52 illustrated. In this example, the point cloud 50 is moving, and the mesh 52 is stationary. For reference purposes, the points in the point cloud 50 are numbered, as shown at 54. Points that interpenetrate the mesh 52 are designated $P_c$, as shown at 56. Elements of the mesh are designated alphabetically, as shown at 58. Tracking points are designated as $P_t$, as shown at 60. Preferably, the motion of the point cloud 50 is controlled by the user 14 through the end effector 20 at a grasp point, shown at 62. The methodology advances to block 110.

In block 110, the methodology partitions the tessellated mesh 52 representing one of the solid objects into smaller regions, so that only the triangles that are close to a predetermined moving point are checked for the occurrence of a collision. In this example, a technique known in the art as an OctTree hierarchic structure is utilized to partition the mesh 52 into smaller regions to improve the computational efficiency of the methodology, as described beginning in circle A of FIG. 3B, to be described. Advantageously, the methodology takes advantage of the connectivity between triangles to improve its efficiency.

The methodology advances to block 115, and the methodology initializes a set of points referred to as a constraint set, and another set of points referred to as a collision set. The constraint set represents the minimum, non-redundant, set of individual points for the moving object that are actively in contact with respect to the other object and fully describe the two object interaction. The collision set includes all the points that are in contact. In this example, the collision set represents moving points from the point cloud 50 that have penetrated the solid, stationary mesh 52. It should be appreciated that the points in the collision set are processed to simulate a realistic physical behavior. In this example, the constraint set and collision set are initially set to zero. The methodology advances to block 120.

In block 120, the methodology determines the relative position of the objects, which in this example is the moving object with respect to the stationary object. For example, the position of the moving object can be associated with that of a haptic device 12, as described with respect to the haptic module 160. The methodology advances to block 125.

In block 125, the methodology modifies the position of either one of the moving object or the stationary object or both, so that none of the points in the constraint set penetrate into the stationary object. It should be appreciated that if a point in the constraint set has penetrated the stationary object, the moving object position is changed until the point moves to the boundary of the stationary object. The methodology advances to circle B described in FIG. 3C to modify the position of one or both of the objects. It should be appreciated that a haptic module 160 may be run concurrently to determine the haptic module force feedback applied to the end effector 20 relative to the movement of the modified position of either one of the objects 18. The methodology advances to block 130.

In block 130, the methodology updates the collision set to include all the moving object points that collide into or penetrate the mesh of the stationary object in this example. The methodology advances to circle C described in FIG. 3D to update the collision set. For example, a tracking technique as described in the co-pending patent application U.S. Ser. No. 09/686,601 is utilized.

The methodology advances to diamond 135 and determines whether the collision set is empty. If the collision set is not empty, the methodology advances to block 140. In block 140, the methodology updates the constraint set by selecting a point from the collision set and adding it to the constraint set. It should be appreciated that if there are too few points in the constraint set, points are added, and if there are too many points, points are taken away. The methodology returns to block 120 and continues in evaluating the position of the point cloud 50 relative to the mesh 52.

Returning to diamond 135, if the collision set is empty, the methodology advances to diamond 145. In diamond 145, the methodology determines if the user 14 wants to continue the collision detection and rendering simulation. If it is determined that the user 14 wants to continue, the methodology returns to block 120 and continues to track the position of the point cloud relative to the mesh. If it is determine that the user 14 does not want to continue, the methodology advances to circle 150 and ends.

It should be appreciated that a haptic module 160 may be iteratively implemented simultaneously with the method of collision detection beginning at circle 100. Advantageously, the method of collision detection is implemented on the first computer system 38 at a slower refresh rate than the haptic module on the second computer system 40.

In block 158, the constraint set is provided to the haptic module 160 as an input. In block 165, the haptic module determines a new position of the object 18 represented by the point cloud 50.

In block 170, the methodology uses the constraint set from block 158 to change the position of the object 18 represented by a point cloud 50, or the object 18 represented by the mesh 52, or both objects, so that none of the points in the constraint set penetrate into the mesh 52, which, in this example, is a mesh of the stationary object.

In block 175, a force feedback is determined that is proportioned to how much the objects have been moved to accommodate the constraints. That is, the new position of the object 18 represents where the two objects would be relative to each other if the physical constraint that they cannot interpenetrate is satisfied. The force feedback is applied using the haptic device 12 proportional to the difference between the colliding position of the object, and the non-colliding position.

Figure 3B:
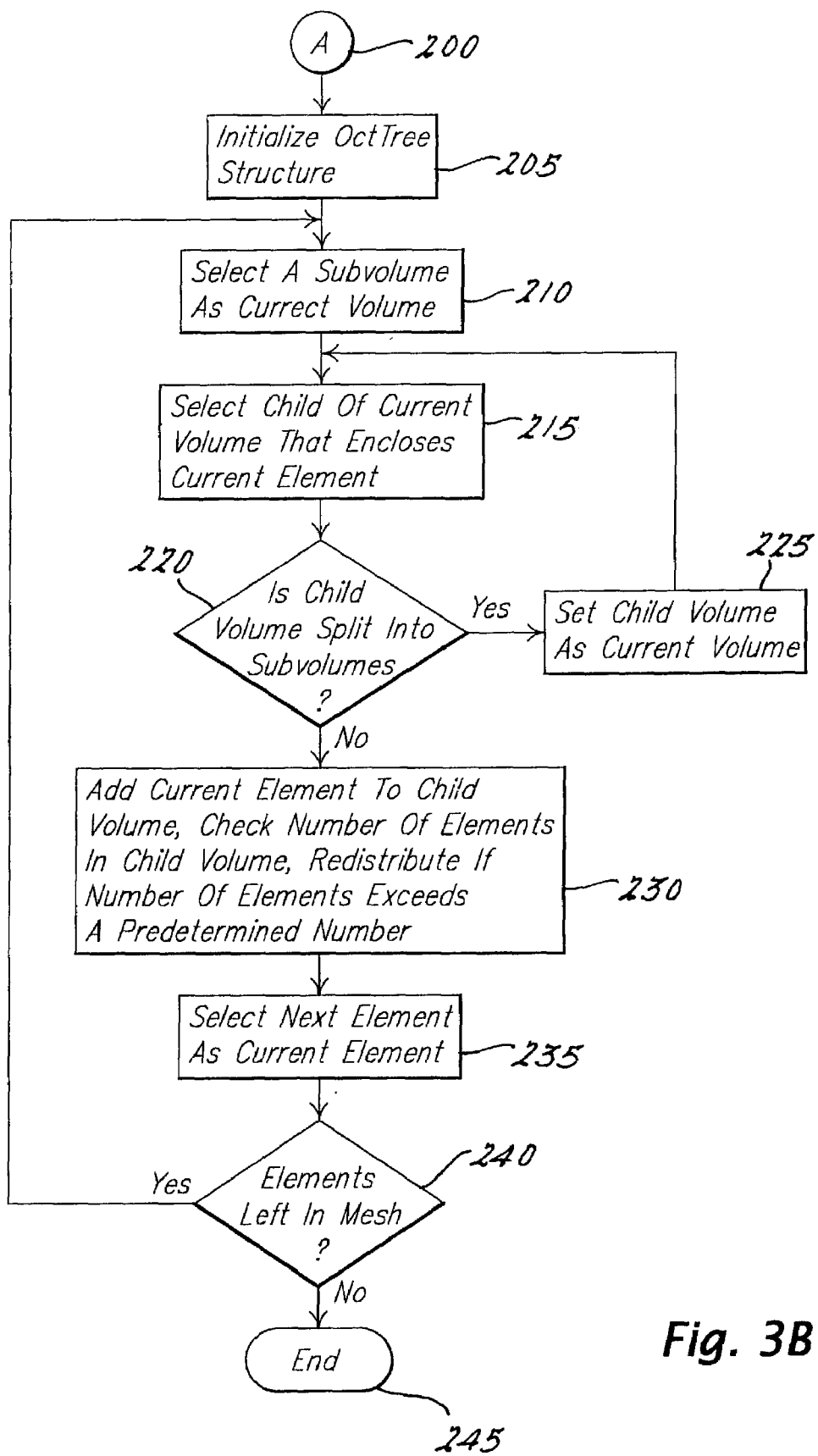

Referring to FIG. 3B, a flowchart of a method for partitioning a tessellated mesh 52 into an OctTree hierarchic structure is described. The method begins in circle 200 when called for by block 110 of FIG. 3A and continues to block 205. Advantageously, the OctTree data structure, as is understood in the art, is used to partition the mesh 52 of the object 18 into smaller regions, so that only triangles close to a moving point are evaluated, in order to more efficiently detect collisions. It should be appreciated that the point cloud 50 could also be partitioned using the OctTree structure, if additional computational efficiency is preferred. The OctTree structure is built and sorted by elements or vertices, triangles, and oversized elements. In this example, the OctTree structure is built by vertices.

Figure 5A:
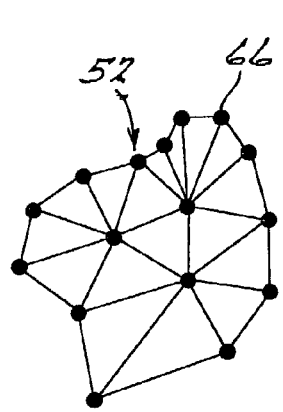
FIGS. 5A–5C schematically illustrate recursive distribution of mesh vertices in an OctTree structure, according to the present invention.
Figure 5B:
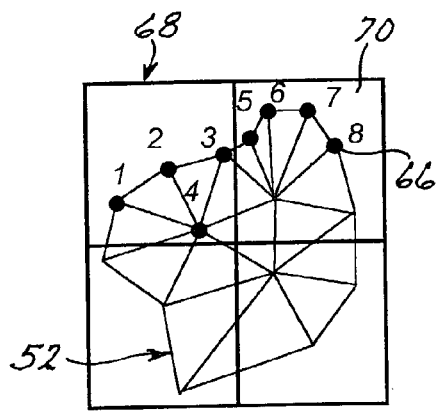
Figure 5C:
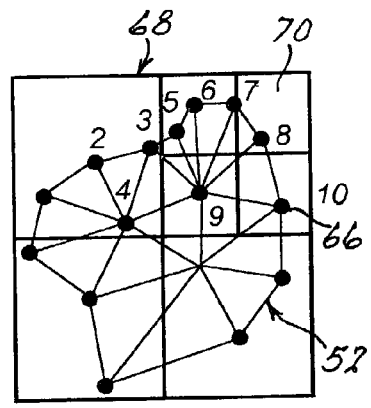

In block 205, the methodology initializes the OctTree by determining the smallest aligned bounding box ABB, that includes the mesh, and then subdivides the mesh into equal subvolumes, or boxes referred to as $ABB_i$, where $_1$ is the number of subvolumes. Each vertex belongs to only one OctTree box. For example, in FIG. 5A, vertices are assigned to the mesh 52 of the stationary object, as shown at 66. The vertices may be numbered for convenience. In FIG. 5B, the aligned bounding box, as shown at 68 is subdivided into four subvolumes, as shown at 70. If the subvolume 70 contains too many vertices 66, the subvolume is subdivided farther, as shown in FIG. 5C. The methodology also selects an element in the mesh model of the stationary object to evaluate, referred to as the current element, or CE. The methodology advances to block 210.

In block 210, the methodology selects one of the subvolumes 70 as the current volume, CABB. The methodology advances to block 215 and determines which child of the current volume CABB, referred to as $CaBB_j$, fully encloses the current element CE. The methodology advances to diamond 220.

In diamond 220, the methodology determines if the child $CABB_j$ is split into subvolumes. If the child $CABB_j$ is split into subvolumes, the child $CaBB_j$ is set as the current volume, CABB, and the methodology returns to block 215 and continues to recursively locate the elements within the OctTree structure. Returning to diamond 220, if the child is not split into subvolumes, the methodology advances to block 230.

In block 230, the element is added to the child subvolume, $CABB_j$. The methodology checks the number of elements in the child subvolume. If there are more than a predetermined number of elements in the child subvolume, the child subvolume is further subdivided into more subvolumes such as eight, and the elements are distributed to those boxes that fully enclose them. If the box does not fully enclose an element, then the element remains in the parent subvolume, CABB. The methodology advances to block 235.

In block 235, the methodology selects another element in the mesh as the current element. The methodology advances to diamond 240 and determines if all elements in the mesh have been assigned a subvolume. If there are elements left in the subvolume, the methodology returns to block 210 and continues to recursively assign the elements in the mesh into subvolumes.

Returning to diamond 240, if there are not elements left to assign to a subvolume, the methodology advances to circle 245 and returns to block 110 of FIG. 3A.

Figure 6A:
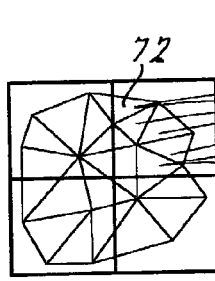
FIGS. 6A–6B schematically illustrate recursive distribution of mesh triangles in an OctTree structure, according to the present invention.
Figure 6A:
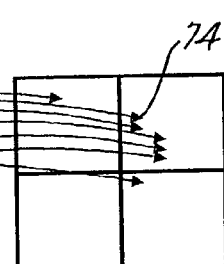
Figure 6B:
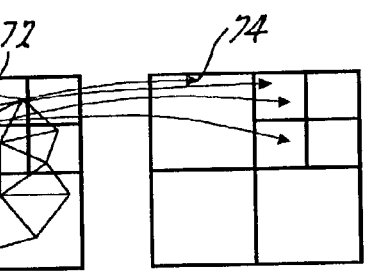
Figure 7:
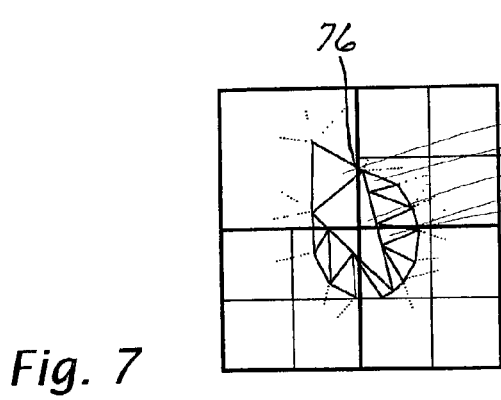
FIGS. 7A–7B schematically illustrate recursive distribution of oversized elements in an OctTree structure, according to the present invention.
Figure 7:
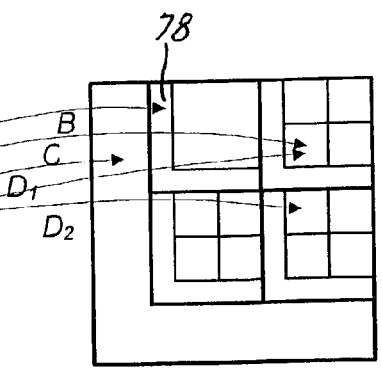

It should be appreciated that in this example, the OctTree structure is built by partitioning the geometry by vertices. That is, the methodology looks for a potential triangle by checking the distance between the moving point and the vertices 66 in the tessellated mesh 52. It is assumed that if the vector is crossing through a triangle, then the moving point must be close to a vertice 66. However, if the mesh 52 has an area of uniform curvature modeled with a small number of relatively large triangles, the point could collide with a triangle and be relatively far from the vertices, so the collision would go undetected. To avoid this situation, the OctTree structure can be assembled using triangles, as shown in FIGS. 6A–6B. In this example, a triangle, shown at 72, belongs to the box indicated by the arrow, as shown at 74. It is more difficult to build the OctTree structure since a triangle can belong to more than one OctTree box. Alternatively, a large triangle can be stored in an oversized element box, as shown in FIG. 7. In this example, a triangle, shown at 76, is assigned a large element box, shown at 78, which represents a node in the OctTree structure.

Figure 3C:
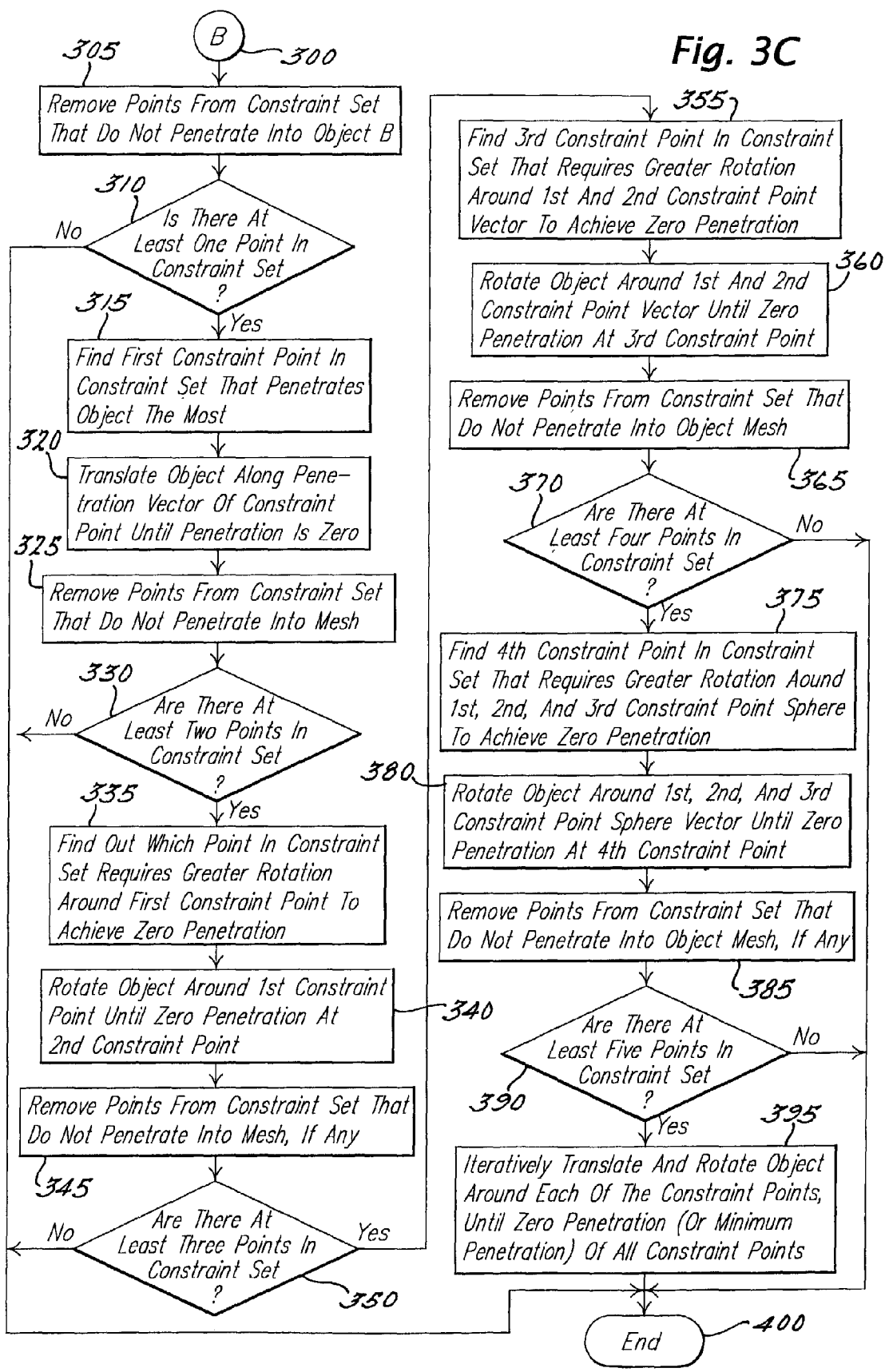

Referring to FIG. 3C, a flowchart of a method illustrating changing the position of one or both of the objects is described. The method begins in circle 300 after being called for by block 125 of FIG. 3A. It should be appreciated that the position of one or both of the objects 18 is changed so that none of the points belonging to the constraint set penetrate into the object 18 represented by the mesh 52. Haptic rendering is utilized to indicate to the user 14 that the moving object has penetrated the other object. Thus, as the user 14 moves the object represented by the point cloud 50 using the haptic device 12, the algorithm prevents penetration of the moving object into the other object. The feeling of the object 18 coming in contact with a solid object is replicated. For example, if the user 14 was performing a simulation demonstrating the ability to install an engine in a vehicle, the methodology would replicate the feeling of the engine contacting the vehicle frame during the installation process.

Figure 8A:
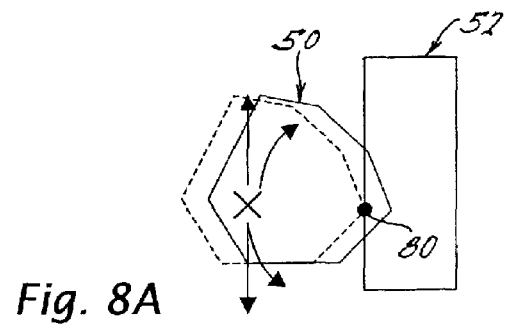
FIGS. 8A–8E schematically illustrate determining a contact point by moving the point cloud along a collision point penetration vector, according to the present invention.
Figure 8B:
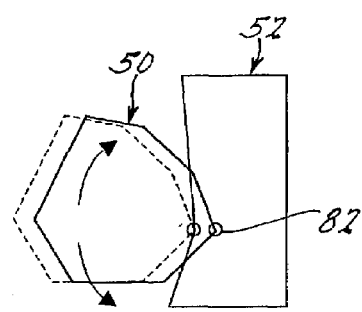

Referring to FIGS. 8A–8E, the motion of the point cloud along a colliding point penetration vector is illustrated. For example, in two-dimensional space, it should be appreciated that the motion of the point cloud has three degrees of freedom (DoF) when not colliding with a stationary mesh. A point in the point cloud colliding with the mesh introduces a constraint characterized by a Degree of Constraint (DoC) that depends on the geometry of the mesh 52 at the point of contact, and the existence of redundant constraints established by other colliding points. A point on line contact introduces one DoC and leaves two DoF for motion, as shown in FIG. 8A at 80. Similarly, a point on edge contact introduces two DoC with one DoF for motion for the point cloud to rotate around the point of contact, as shown in FIG. 8B at 82.

Figure 8C:
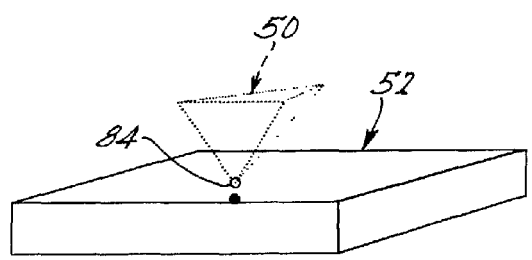
Figure 8D:
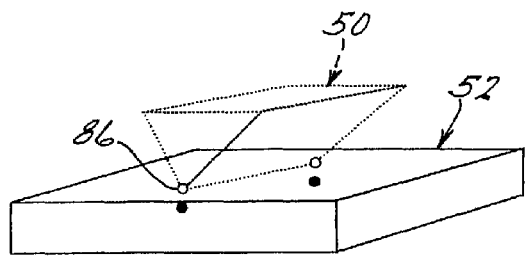

In three-dimensional space, objects can move freely in three directions as well as rotate around any of the three axis, therefore the number of degrees of freedom is six. Each point can either contact the mesh on a plane (1 DoC), edge (2 DoC) or on a vertex (3 DoC). If a single point of the moving object touches the facet of the solid object represented by a mesh, there are 6−DoC=5 DoF left. Thus, the point cloud 50 can translate on the facet plane and freely rotate around its three axis, as shown in FIG. 8C at 84. If two points contact the plane, there are two DoF, leaving for degrees for motion. In one of the potential interactions, the solid is free to slide on one of its edges on a plane, free to rotate around the edge and on the plane, parallel to it, as shown in FIG. 8D at 86.

Figure 8E:
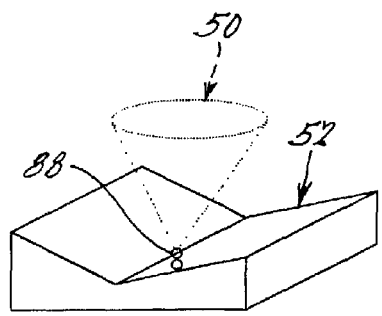

Similarly, a point on edge constraint results in the object free to move along a line and rotate around its three axis, for a total of four DoF, as shown in FIG. 8E at 88. It should be appreciated that many other combinations of constraints are foreseeable. The methodology advances to block 305.

In block 305, the methodology removes a point from the constraint set that does not penetrate into the mesh 52. The methodology advances to diamond 310 and determines if there is at least one point left in the constraint set. It should be appreciated that one point in the constraint set is representative of a point to surface contact of the point in the constraint set with the stationary object. If there is not at least one point in the constraint set, the methodology advances to circle 400 and returns to block 125 of FIG. 3A and continues. If there is at least one point in the constraint set, the methodology advances to block 315.

In block 315, the methodology determines which point in the constraint set has the greatest magnitude of penetration into the mesh 52 of the object 18. In this example, it is assumed that points that collide with the mesh 52 will penetrate into the surface by a certain amount. For point-on-plane, point-on-edge and point-on-vertex contacts, penetration unit vectors $\vec{v}_p$ are described respectively as:

$$\vec{v}_p = \vec{n}_i, \quad (1)$$

$$\vec{v}_p = \frac{(P_{Ci} - P_{Ti}) - (P_{Ci} - P_{Ti})\vec{l}}{\|(P_{Ci} - P_{Ti}) - (P_{Ci} - P_{Ti})\vec{l}\|_2}, \quad (2)$$

$$\vec{v}_p = \frac{P_{Ci} - P_{Ti}}{\|(P_{Ci} - P_{Ti})\|_2} \quad (3)$$

The penetration magnitudes can be described respectively as:

$$\Delta P_{CTi} = (P_{Ci} - P_{T1})\vec{n}_1, \quad (4)$$

$$\Delta P_{CT1} = \|(P_{C1} - P_{T1}) - (P_{Ci} - P_{Ti})\vec{l}_1\|_2, \quad (5)$$

$$\Delta P_{Ct1} = \|P_{C1} - P_{t1}\|_2 \quad (6)$$

Figure 9:
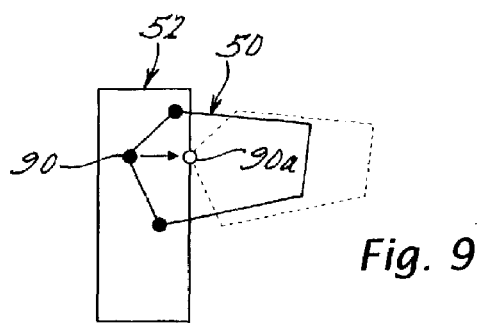
FIG. 9 schematically illustrates a farthest penetrating contact point, according to the present invention.

Preferably, a point is selected that will minimize the overall potential energy of all contacts, assuming that the sum of all contacts is the sum of all the individual penetration magnitudes, squared. In the example of a new collision, that point is typically the point that is penetrating the most, that is, having the greatest displacement, as shown in FIG. 9 at 90. Preferably, a tracking and collision detection method is used to determine this point, such as the haptic module methodology 160 previously described. The methodology advances to block 320.

In block 320, the methodology translates the moving object along a penetration vector for the most penetrating point 90, by its penetration magnitude, until the point is no longer penetrating the mesh 52 of the stationary. It should be appreciated that the translated point can just touch an edge of the mesh of the stationary object, as shown at 90A. The methodology advances to block 325.

In block 325, the methodology removes any points from the constraint set that do not penetrate into the mesh 52. The methodology advances to diamond 330 and determines if there are at least two points in the constraint set. It should be appreciated that two points in the constraint set represents two degrees of freedom, such as point on an edge of the surface, or contact of a wedge with an edge of the stationary surface. If there are not at least two points in the constraint set, the methodology advances to circle 400 and returns to block 125 of FIG. 3A. Returning to diamond 330, if there are at least two points in the constraint set, the methodology advances to block 335.

In block 335, the methodology determines whether a second point in the constraint set requires greater rotation around the first point to achieve zero penetration. For example, two transformations satisfy this constraint. First, the point cloud 50 representing the moving object in this example is translated along a vector that doesn't violate the first constraint. If the constraint is of the point on plane type, then the vector is coplanar with the plane. If the constraint is point on edge, the vector must be co-linear with the edge. The point-on-vertex type constraint is nonexistent. For example, if the first and second contact points are both point-on-plane, the translation $\Delta \vec{P}_{CT1}$ is described as:

$$\Delta \vec{P}_{CTi} = \left[ (P_{Ci} - P_{Ti}) - (P_{Ci} - P_{Ti})\vec{n}_{Cl} \right] \quad (7)$$

$$\left[ \frac{\|(P_{Ci} - P_{Ti})\|_2^2}{\left[ (P_{Ci} - P_{Ti}) - (P_{Ci} - P_{Ti})\vec{n}_{Cl} \right] \cdot (P_{Ci} - P_{Ti})} \right],$$

Figure 10A:
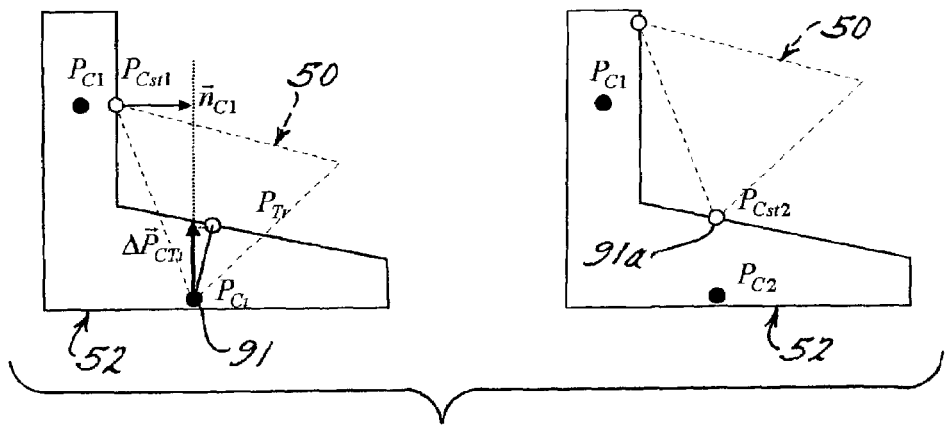
FIGS. 10A–10C schematically illustrate determining an active constraint by translating the point cloud, according to the present invention.

Referring to FIG. 10A, an example of finding the second active constraint by translating the point cloud is illustrated at 91 and 91A, respectively.

The methodology advances to block 340, and the object is rotated around the first point of contact until zero penetration is achieved at the second point of contact. For example, the length of the rotation arm is described as:

$$l = \|P_{Ci} - P_{Cst1}\|_2 \quad (8)$$

The projection point $P_d$ on the plane containing the second tracking point $P_{Ti}$ is found and the length of the vector connecting $P_d$ and $P_{T1}$ as:

$$l_D = \|P_D - P_{Ti}\|_2 \quad (9)$$

The location of the contact point $P_{C1}$ on the plane after rotating the point-cloud is:

$$P_{Cst2} = P_D + (P_{Ti} - P_D)\frac{l}{l_D} \quad (10)$$

The rotation of the object 18 is evaluated as a quaternion, $q = (\vec{\omega}, \alpha)$, whose components are the rotation axis and the rotation angle respectively, using the cross product:

$$V_{cross} = (P_{Ci} - P_{Cst1}) \times (P_{Cst2} - P_{Cst1}) \quad (11)$$

$$\vec{\omega} = V_{cross}/\|V_{cross}\|_2 \quad (12)$$

$$\alpha = \|V_{cross}\|_2 / (\|P_{Ci} - P_{Cst1}\|_2 \|P_{Cst2} - P_{Cst1}\|_2) \quad (13)$$

Figure 10B:
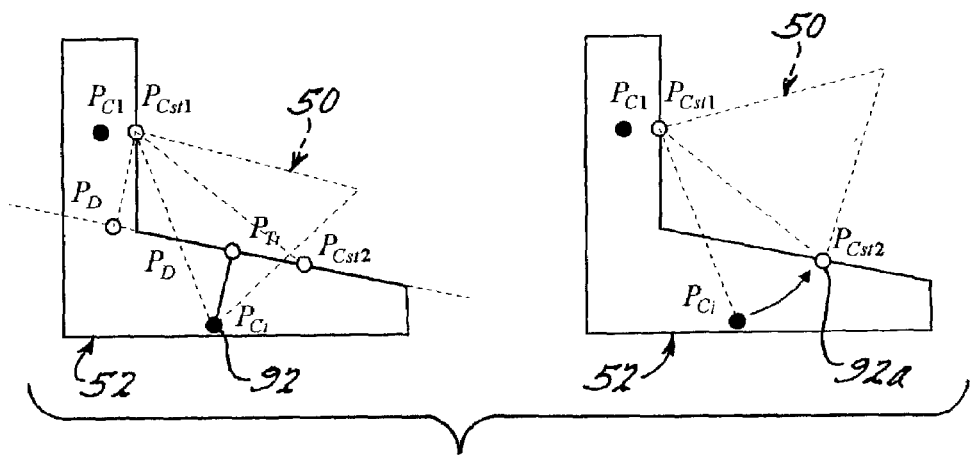

The second most active constraint is found by rotating the point-cloud, as shown in FIG. 10B at 92 and 92A, respectively.

The methodology advances to block 345 and removes a point from the constraint set that does not penetrate into the mesh 52. The methodology advances to diamond 350.

In diamond 350, the methodology determines if there are at least three points in the constraint set. It should be appreciated that three points in the constraint set indicate three degrees of freedom, including point on corner contact with a box, or surface to surface contact. If there are not at least three points in the constraint set, the methodology advances to circle 400 and returns to block 125 of FIG. 3A. Returning to diamond 350, if there are at least three points in the constraint set, the methodology advances to block 355.

Figure 10C:
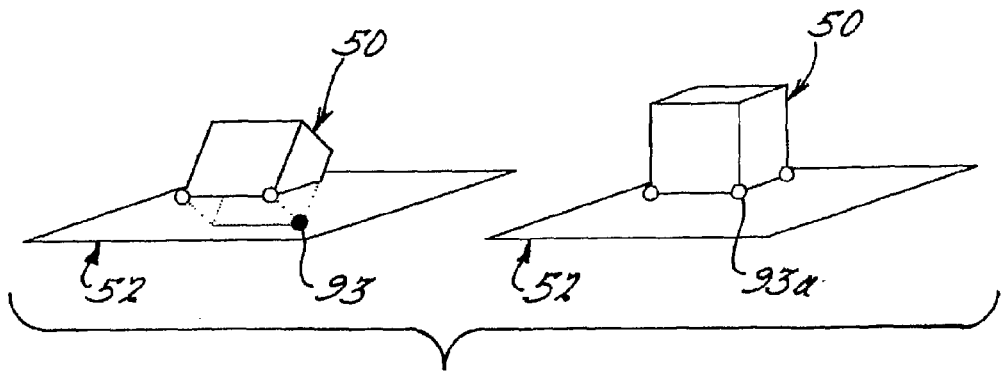

In block 355, the methodology determines whether a third point in the constraint set requires greater rotation around the first point and second point to achieve zero penetration. For example, a third point is selected and the point cloud 50 is rotated around an axis connecting the first two constraint points, until the contact point no longer penetrates, as shown in FIG. 10C at 93 and 93A, respectively.

The methodology advances to block 360, and the object is rotated around the first point of contact vector and second point of contact vector until zero penetration is achieved at the third point of contact, as previously described with respect to two points.

The methodology advances to block 365 and removes a point from the constraint set that does not penetrate into the mesh. The methodology advances to diamond 370.

In diamond 370, the methodology determines if there are at least four points in the constraint set. It should be appreciated that four points represent four degrees of constraint or two degrees of freedom, such as two points on a surface or one point on an edge of a surface. If these are not at least four points in the constraint set, the methodology advances to circle 400 and returns to block 125 of FIG. 3A. Returning to diamond 370, if there are at least four points in the constraint set, the methodology advances to block 375.

In block 355, the methodology determines which fourth point in the constraint set requires greater spherical rotation around the first point and second and third points to achieve zero penetration. For example, a fourth point is selected and the point cloud is rotated on a sphere connecting the other constraint points, until the contact point no longer penetrates.

The methodology advances to block 380, and the object is rotated around the first point of contact, second point of contact and third point of contact vectors until zero penetration is achieved at the fourth point of contact, as previously described with respect to two points.

The methodology advances to block 385 and removes a point from the constraint set that does not penetrate into the mesh 52. The methodology advances to diamond 390.

In diamond 390, the methodology determines if there are five or more points in the constraint set. It should be appreciated that five points represent one degree of freedom, such as from contact of a point with an edge of a cube. If there are not at least five points in the constraint set, the methodology advances to circle 400 and returns to block 125 of FIG. 3A. Returning to diamond 390, if there are at least five points in the constraint set, the methodology advances to block 395.

In block 395, the methodology continues to iteratively translate and rotate the object around each point of contact, until zero penetration or minimum penetration of all points of contact. The methodology advances to circle 400 and returns to block 125 of FIG. 3A.

Figure 3D:
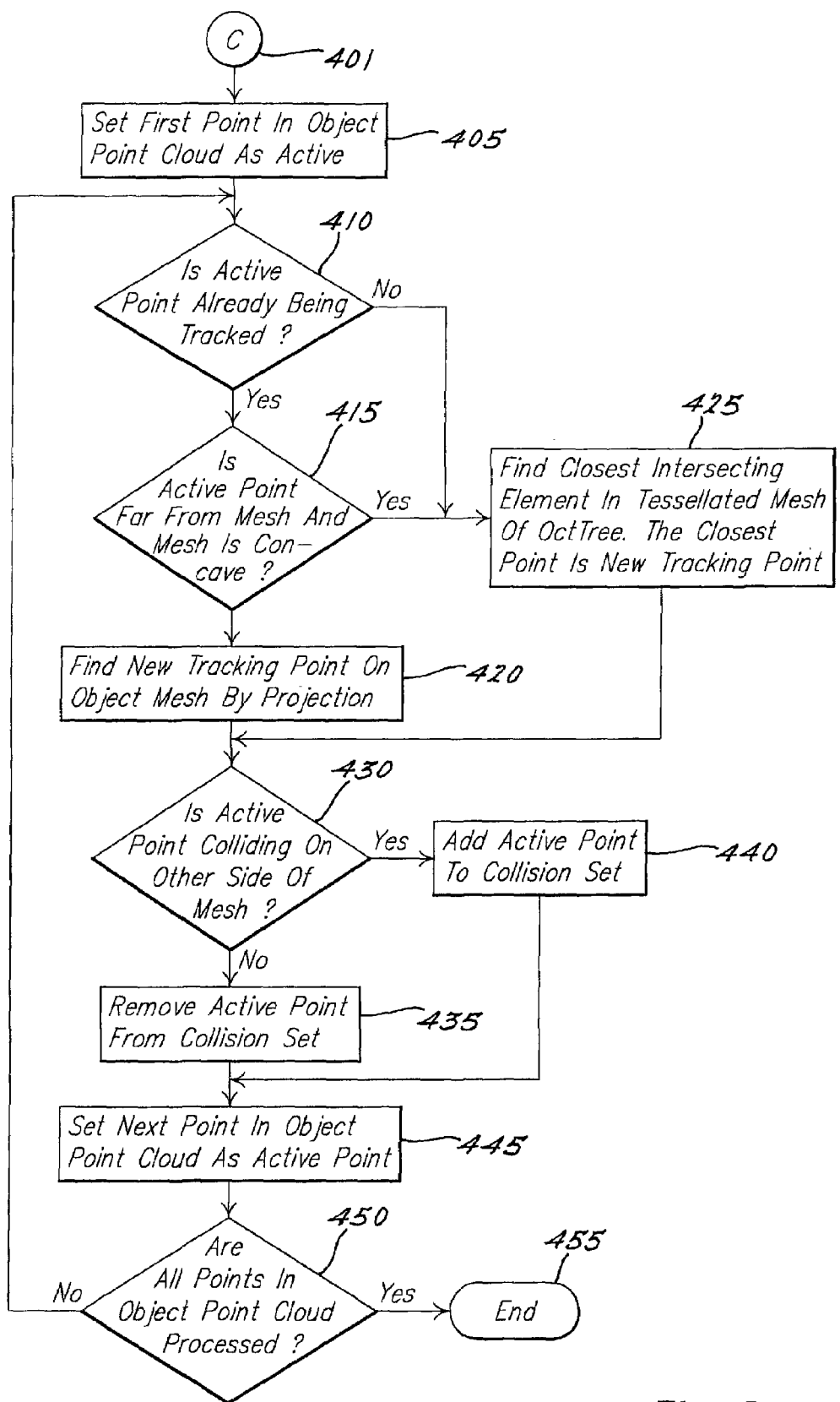

Referring to FIG. 3D, a flowchart illustrating a method for updating the collision set is described. It should be appreciated that this method can also be used for initializing the collision set, if necessary. The method begins in block 401 after being called for by block 130 in FIG. 3A. The methodology advances to block 405.

Figure 11:
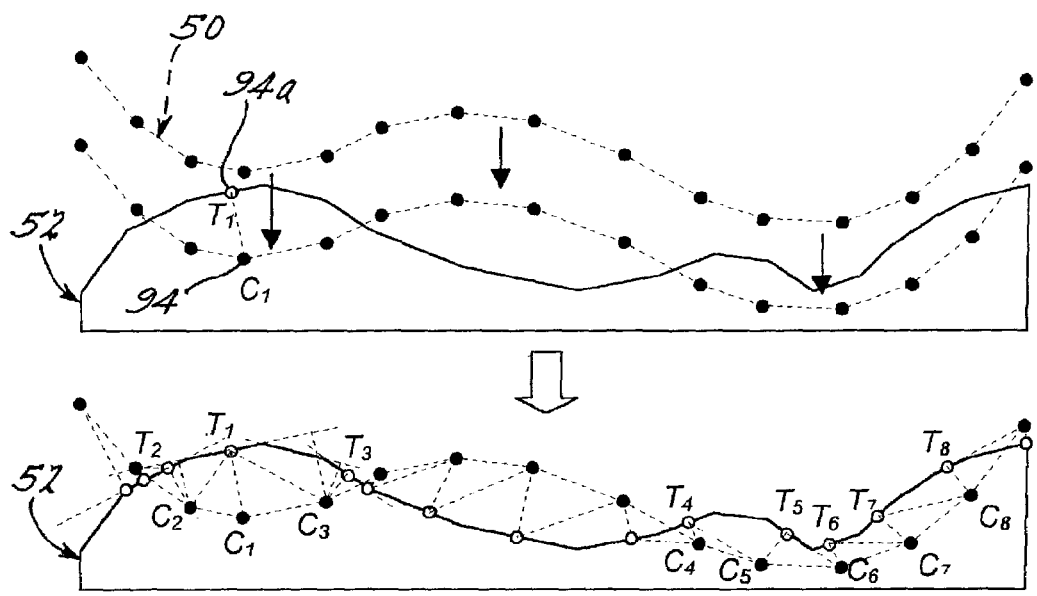
FIGS. 11–13 schematically illustrate a collision between the point cloud and the mesh, according to the present invention.

In block 405, the methodology selects a point in the point cloud 50 as the active point. Preferably, the active point is selected arbitrarily. The methodology advances to diamond 410. In diamond 410 the methodology determines whether the active point is already being tracked, such as by using a collision detection technique. For example, referring to FIG. 11, the use of a point and tracking to detect collisions between the point cloud 50 and mesh 52 is illustrated. The points in the collision set are designated as $C_1$, as shown at 94. The tracking points on the mesh are designated $T_1$, as shown at 94A. Once the first tracking point $T_1$ is found, the other tracking points $T_2$ ... can similarly be located. If the active point is being tracked, the methodology advances to diamond 415.

Figure 12:
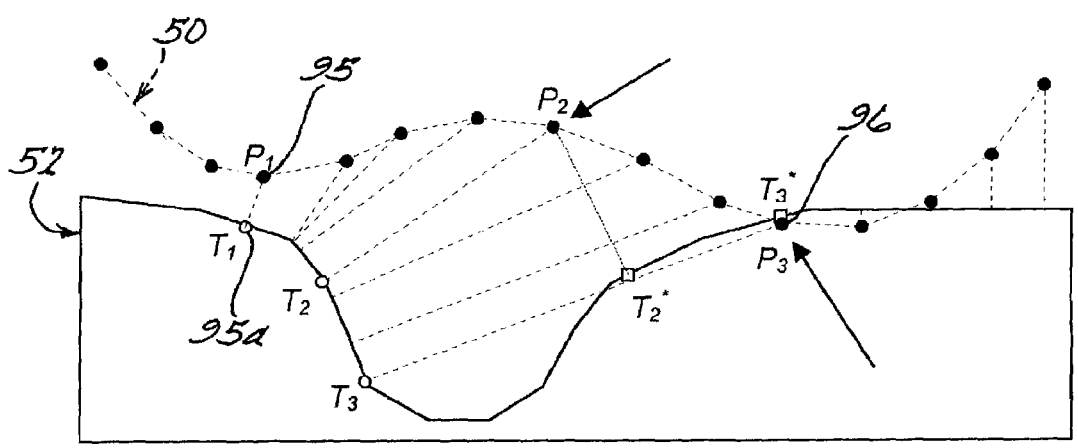
Figure 13:
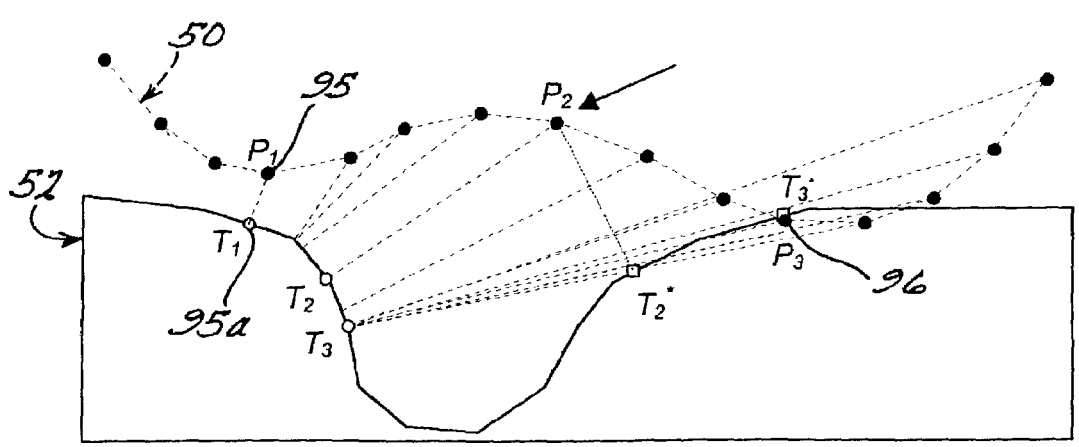

In diamond 415, the methodology determines if the active point is far from the mesh 52 of the stationary object and the mesh 52 is concave. For example, the location on the mesh 52 that minimizes the distance from a point in space may be only a local and not a global minimum. As illustrated in FIGS. 12 and 13, beginning with a point $P_1$, as shown at 95, the algorithm tracks on the mesh for all the other elements of the point cloud 50. The local tracking point $T_1$, as shown at 95A, is a local as well as a global minimum. Similarly, $T_2$ is only a local minimum since $T_2$ is closer to the target point $P_2$, and the same is true of $P_3$ and $T_3$, only the collision of $P_3$ with the mesh is undetected, as shown at 96, since the tracking point on a convex mesh is always a global minimum. The methodology advances to block 420 and continues.

In bock 420, the methodology finds a new tracking point on the mesh 52. For example, the point cloud is sampled, and a predetermined number of points are extracted from the point cloud 50. For example, the OctTree structure for the mesh 52 of the stationary object in this example is searched to identify a candidate colliding triangle with the smaller set of points extracted from the point cloud. The remaining neighboring points in the point cloud 50 are tracked using the tracking technique, as previously described. Alternatively, the mesh 52 is partitioned into convex regions and a tracking algorithm is applied. However, this technique does not cover the majority of shapes that are not a union of finite convex parts. The methodology advances to diamond 430, to be described.

Returning to diamond 415, if the active point is far from the mesh 52 and the mesh 52 is concave, the methodology advances to block 425. In block 425, the methodology finds the closest intersecting element in the OctTree structure of the tessellated mesh, and uses that point as the new tracking point. For example, a vector is used to describe the motion between the point and an element in the mesh 52. The methodology advances to diamond 430.

In diamond 430, the methodology determines which side of the mesh 52 the active point is colliding on. For example, the methodology determines if the active point is colliding on the other side of the mesh of the stationary object. If the active point is colliding on the other side of the mesh, the methodology advances to block 440 and adds the active point to the set of points in the collision set. The methodology advances to block 445 and continues.

Returning to diamond 430, if the active point is not colliding on the other side of the mesh, the methodology advances to block 435 and removes the active point from the collision set. The methodology advances to block 445.

In block 445, the methodology selects another point in the point cloud 50 as the active point. The methodology advances to diamond 450 and determines whether all points in the point cloud 50 have been evaluated. If all the points have not been evaluated, the methodology returns to diamond 410 and continues to evaluate the points in the point cloud. Returning to diamond 450, if all the points in the point cloud of the moving object have not been processed, the methodology advances to circle 455 and returns to block 130 of FIG. 3A.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A system of real-time collision detection and rendering between solid geometric objects within a geometric model comprising:
   a computer system, wherein said computer system includes a memory, a processor, a user input device and a display device;
   at least one computer-generated geometric model stored in the memory of said computer system wherein the geometric model includes a solid geometric model of a non-deformable object that is stationary, and a solid geometric model of a non-deformable object that is movable;
   a haptic device operatively in communication with said computer system, wherein said haptic device includes a haptic end effector for transmitting information between a user and said geometric model;
   an executable collision detection and rendering software program associated with said computer system, wherein a solid geometric object that is in motion from said geometric model is represented as a point cloud that includes a polygon of points and the motion of the point cloud is controlled by a haptic device at a grasp point on the point cloud, and another solid geometric object that is stationary from said geometric model is represented as a mesh, and the mesh is partitioned into an organized data structure, a collision set is identified by selecting actively colliding points from the moving point cloud that do not include the grasp point, that penetrate the stationary mesh, a constraint set is identified by selecting a predetermined number of points from the collision set and the constraint set does not include the grasp point, the constraint set is used to identify a type of collision between the moving object and the stationary object and render the collision by rotating and translating a position of the colliding solid object using the haptic device until none of the points in the constraint set penetrate into the partitioned mesh of the stationary solid object, and force and torque feedback is provided to the user through said haptic device relative to a change in the position of the moving solid object with respect to the stationary solid object to render the collision.

2. The system as set forth in claim 1 including a virtual reality display mechanism operatively in communication with said computer system and said haptic device so that the user can see said objects in a virtual environment.

3. The system as set forth in claim 1 wherein said haptic device tactilely conveys restricting penetration of the moving solid object into the stationary object to the user so that a surface of the moving solid object or a surface of the stationary solid object is not deformed.

4. A method of real-time collision detection and rendering between solid geometric objects within a geometric model, said method comprising the steps of:
   representing one solid, non-deformable, object from a geometric model that is in motion as a point cloud and another solid, non-deformable object from the geometric model that is stationary as a mesh, wherein the moving point cloud is a polygon of points and the motion of the point cloud is controlled by a haptic device at a grasp point on the point cloud;
   partitioning the mesh of the stationary solid object into an organized data structure;
   identifying a collision set, wherein the collision set is a set of actively colliding points from the moving point cloud colliding with a surface of the stationary solid object, and the collision set does not include the grasp point;
   identifying a constraint set, wherein the constraint set includes a predetermined number of points selected from the collision set, and the collision set does not include the grasp point;
   identifying a type of collision between the moving object and the stationary object using the constraint set and the partitioned mesh of the stationary solid object;
   rendering collision using the constraint set by rotating and translating a position of the colliding solid object using the haptic device, until none of the points in the constraint set penetrate into the partitioned mesh of the stationary solid object; and
   providing a force and torque feedback to a user through the haptic device relative to a change in the position of the moving solid object with respect to the stationary object to render the collision.

5. The method as set forth in claim 4 including the step of continuously tracking a position of at least one of the objects.

6. The method as set forth in claim 4 wherein said step of partitioning the mesh of the stationary solid object includes the steps of partitioning the mesh into an OctTree data structure by:
   determining a tightest aligned bounding box containing the mesh, wherein the mesh includes a vertex, or an element or a triangle;
   dividing the aligned bounding box into subvolumes, with each subvolume containing a portion of the mesh;
   selecting a vertex or element or triangle from the mesh as a current element;
   selecting a subvolume as a current volume;
   determining a child subvolume of the current volume that encloses the current element;
   adding the current element to the child subvolume;
   determining if there are more than a predetermined number of vertices, or elements or triangles in the child subvolume, and further subdividing the child subvolume to distribute excess vertices or elements or triangles within respective subvolumes that enclose the vertices or elements or triangles; and
   continuing to recursively distribute the vertices or elements or triangles of the mesh to subvolumes within the aligned bounding box until all of the vertices, elements or triangles are allocated to subvolumes.

7. The method as set forth in claim 4 including the steps of:
   generating a force feedback that is conveyed to the user by the haptic device restricting penetration of the moving solid object into the stationary solid object, wherein the force feedback is proportional to the change in position of the moving solid object.

8. The method as set forth in claim 1 wherein said step of identifying a type of collision using the constraint set includes the steps of:

removing points from the constraint set that do not penetrate into the mesh of the stationary solid object;

determining if there is at least a predetermined number of points in the constraint set;

identifying a point in the constraint set that penetrates the farthest into the mesh, if there are at least a predetermined number of points in the constraint set; and moving the moving object along a penetration vector of the farthest penetrating point until that point does not penetrate the mesh of the stationary solid object.

9. The method as set forth in claim 8 including the step of iteratively translating and rotating the position of the moving object using the haptic device until the points in the constraint set do not penetrate into the mesh of the stationary solid object.

10. The method as set forth in claim 4 wherein said step of identifying a collision set further includes the steps of:
iteratively selecting a point from the point cloud of the moving solid object as an active point;
identifying a position of the active point using tracking;
determining if the active point is a predetermined distance from the mesh of the stationary solid object or if the mesh is concave and finding a new tracking point if the active point is not a predetermined distance from the mesh or if the mesh is not concave;
using the position of the active point to determine if the active point is colliding on an other side of the mesh;
removing the active point from collision set if the active point is not colliding on the other side of the mesh; and
adding the active point to the collision set if the active point is colliding on the other side of the mesh.

11. The method as set forth in claim 4 wherein the moving object represented by the point cloud collides into the stationary object represented by the mesh.

12. A method of real-time collision detection and rendering between solid geometric objects within a geometric model, said method comprising the steps of:
modeling a solid, non-deformable object that is in motion from a solid geometric model as a point cloud and another solid, non-deformable object that is stationary from the solid geometric model as a mesh, wherein the moving point cloud is a polygon of points that collides with the mesh and the motion of the point cloud is controlled by a haptic device at a grasp point;
partitioning the mesh of the stationary solid object into an organized data structure;
identifying a collision set, wherein the collision set includes a predetermined number of actively colliding points from the moving point cloud, and the collision set does not include the grasp point;
identifying a constraint set, wherein the constraint set includes a predetermined number of points selected from the
identifying a type of collision between the moving solid object and the stationary object using the constraint set and the partitioned mesh of the stationary solid object;
using the type of collision to change a position of the moving solid object using the haptic device by rotating and translating the position of the moving object until none of the points in the constraint set penetrate into the partitioned mesh of the stationary solid object;
updating the collision set; and
providing the user with a force and torque feedback using the haptic device to render the collision between the moving solid object and stationary solid object that is relative to the change in position of the moving solid object so that the surface of the stationary object is not deformed.

13. The method as set forth in claim 12 wherein the organized data structure is an OctTree data structure.

14. The method as set forth in claim 13 wherein said step of partitioning the mesh of the stationary solid object includes the steps of:
determining a tightest aligned bounding box containing the mesh, wherein the mesh includes a vertex, or an element or a triangle;
dividing the aligned bounding box into subvolumes, with each subvolume containing a portion of the mesh;
selecting a vertex or element or triangle from the mesh as a current element;
selecting a subvolume as a current volume;
determining a child subvolume of the current volume that encloses the current element;
adding the current element to the child subvolume;
determining if there are more than a predetermined number of vertices, or elements or triangles in the child subvolume, and further subdividing the child subvolume to distribute excess vertices or elements or triangles within respective subvolumes that enclose the vertices or elements or triangles; and
continuing to recursively distribute the vertices or elements or triangles of the mesh into subvolumes within the aligned bounding box until the vertices, elements or triangles are allocated to subvolumes.

15. The method as set forth in claim 12 including the step of:
generating a force feedback that is conveyed to the user by the haptic device restricting penetration of the moving solid object into the stationary solid object, wherein the force feedback is proportional to the change in position of the moving solid object.

16. The method as set forth in claim 12 wherein said step of identifying a type of collision using the constraint set includes the steps of identifying the type of collision as a point on plane contact, a point on edge contact or a point on vertex contact by:
removing points from the constraint set that do not penetrate into the mesh of the stationary solid object;
determining if there is at least a predetermined number of points in the constraint set;
identifying a point in the constraint set that penetrates the farthest into the mesh of the stationary solid object, if there are at least a predetermined number of points in the constraint set; and
moving the moving solid object along a penetration vector of the farthest penetrating point until that point does not penetrate the mesh of the stationary solid object.

17. The method as set forth in claim 16 including the step of iteratively translating and rotating the position of the moving solid object using the haptic device until the points in the constraint set do not penetrate into the mesh.

18. The method as set forth in claim 12 wherein said step of updating a collision set further includes the steps of:
iteratively selecting a point from the point cloud of the moving solid object as an active point;
identifying a position of the active point using tracking;
using the position of the active point to determine if the active point is colliding on an other side of the mesh of the stationary solid object;
removing the active point from collision set if the active point is not colliding on the other side of the mesh; and adding the active point to the collision set if the active point is colliding on the other side of the mesh.

19. The method as set forth in claim 18 including the steps of:
determining if the active point is a predetermined distance from the mesh of the stationary solid object or if the mesh is concave and finding a new tracking point on the mesh if the active point is not a predetermined distance from the mesh or if the mesh is not concave.

20. The method as set forth in claim 12 including the step of continuously tracking a position of at least one of the objects.

* * * * *